(12) United States Patent
Woo et al.

(10) Patent No.: US 11,300,196 B2
(45) Date of Patent: Apr. 12, 2022

(54) OIL COOLING APPARATUS FOR HYDROSTATIC TRANSMISSIONS

(71) Applicant: LS MTRON LTD., Anyang-si (KR)

(72) Inventors: Kyung Nyung Woo, Anyang-si (KR); Jong Rak Choi, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 356 days.

(21) Appl. No.: 16/431,172

(22) Filed: Jun. 4, 2019

(65) Prior Publication Data
US 2020/0003294 A1 Jan. 2, 2020

(30) Foreign Application Priority Data

Jul. 2, 2018 (KR) .................. 10-2018-0076479
Jan. 24, 2019 (KR) .................. 10-2019-0009481

(51) Int. Cl.
*F16H 57/04* (2010.01)
*F16H 61/4165* (2010.01)

(52) U.S. Cl.
CPC ..... *F16H 57/0413* (2013.01); *F16H 57/0424* (2013.01); *F16H 61/4165* (2013.01)

(58) Field of Classification Search
CPC .... F16H 57/413; F16H 57/424; F16H 57/416; F16H 57/417; F16H 57/03; F16H 61/4165; F28F 13/12; F28F 2250/104; F28F 2250/106; F28F 2250/102; F28F 2250/108; F28F 2215/10
See application file for complete search history.

(56) References Cited

U.S. PATENT DOCUMENTS

| 7,222,485 | B2 | 5/2007 | Shibata et al. |
| 9,657,733 | B2 | 5/2017 | Chadwick et al. |
| 2006/0283183 | A1* | 12/2006 | Shibata ............... F16H 57/0415 60/456 |
| 2019/0237827 | A1* | 8/2019 | Ge .................... H01M 10/6554 |

FOREIGN PATENT DOCUMENTS

| JP | 2002250572 A | * | 9/2002 | ............... F28F 3/12 |
| JP | 2018-003683 A | | 1/2018 | |

* cited by examiner

*Primary Examiner* — Daniel D Yabut
(74) *Attorney, Agent, or Firm* — K&L Gates LLP

(57) ABSTRACT

The present invention relates to an oil cooling apparatus for hydrostatic transmissions that includes a cooling main body coupled to a transmission case in which a hydrostatic transmission is installed; an accommodating groove formed in the cooling main body to accommodate oil; a cover unit coupled to the cooling main body to cover the accommodating groove; a supply port configured to supply the oil to the accommodating groove; a discharge port configured to discharge the oil from the accommodating groove; a plurality of guide ribs installed at positions spaced apart from each other to guide a flow direction of oil flowing along a flow path formed in the accommodating groove; a first hurdle unit coupled to at least one of the guide ribs to form a first flow region through which the oil passes; and a second hurdle unit coupled to at least one of the guide ribs to form a second flow region through which the oil passes.

9 Claims, 7 Drawing Sheets

【Figure 1】
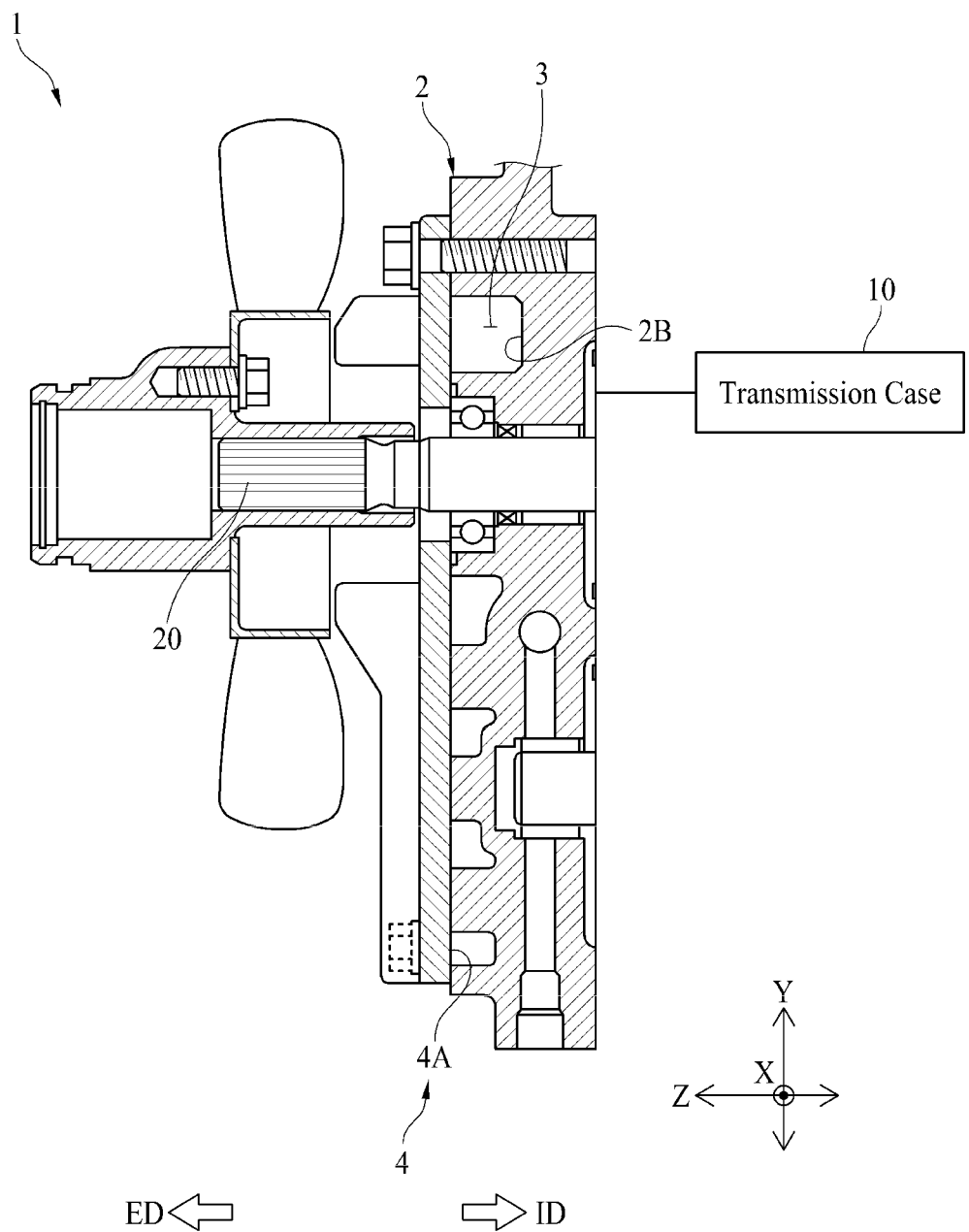

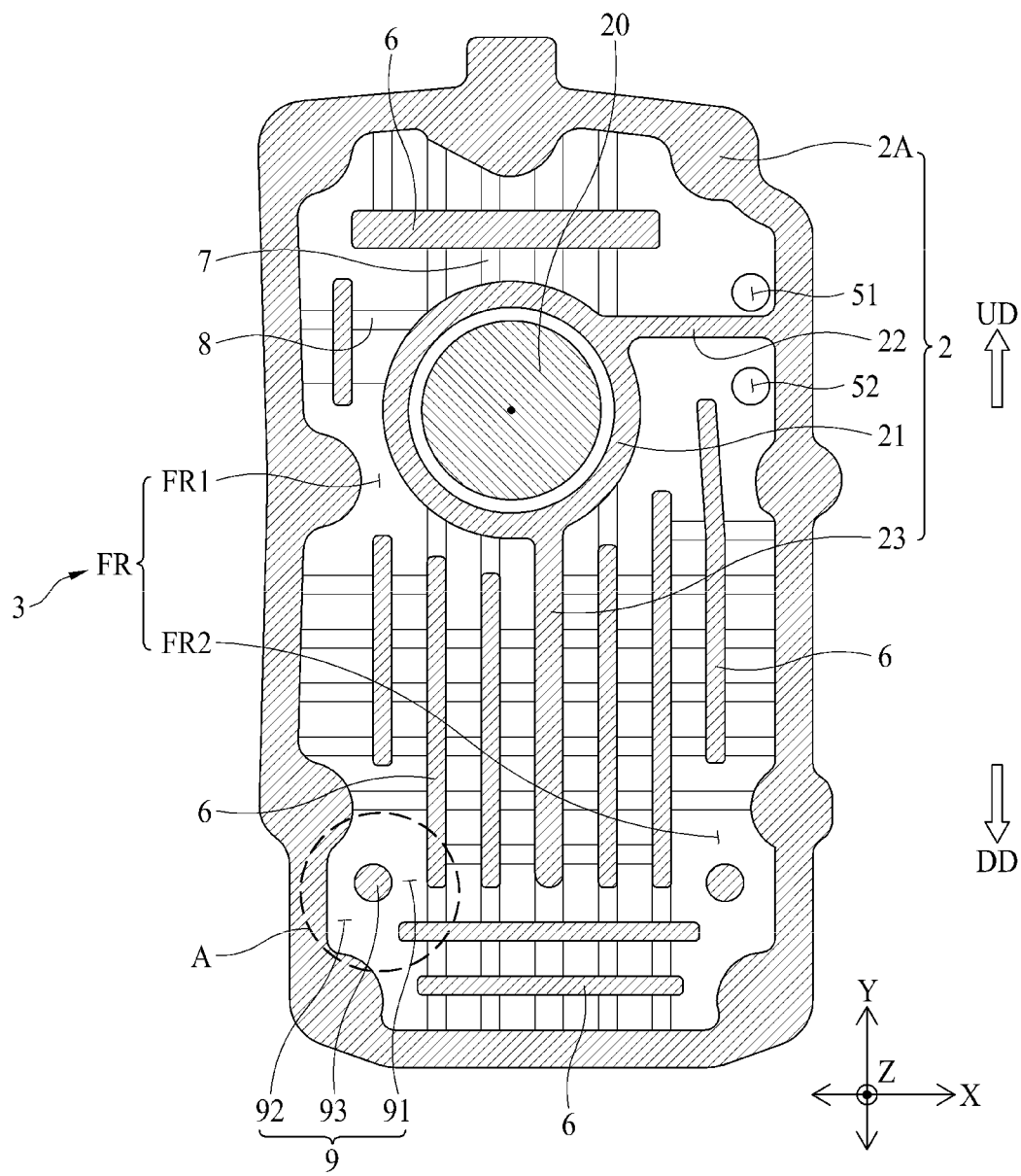
【Figure 2】

[Figure 3]
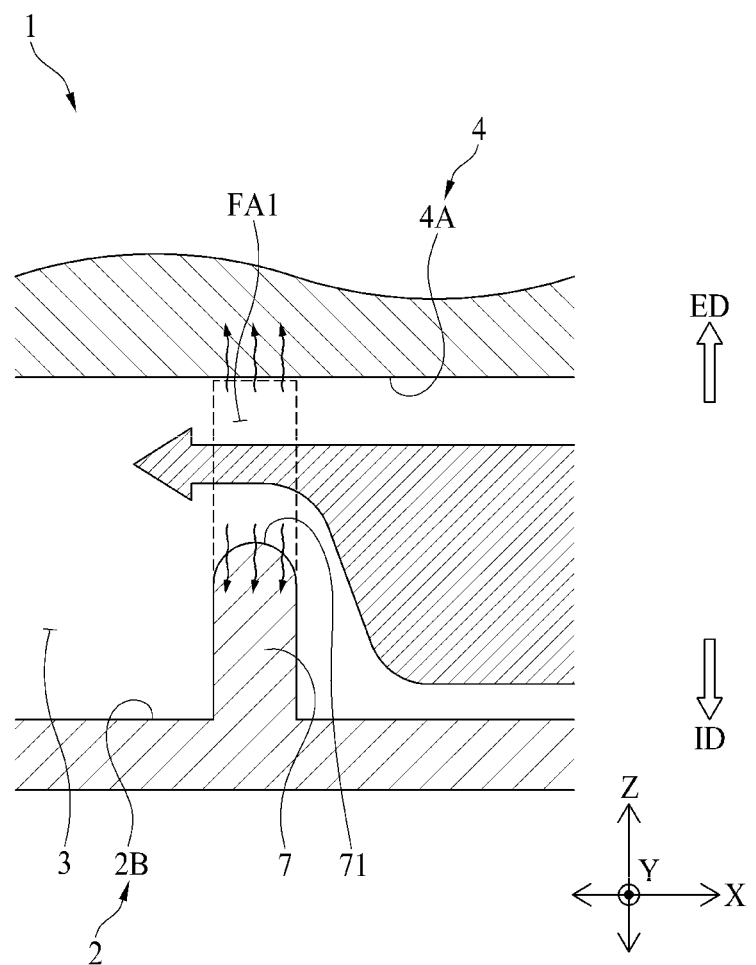

【Figure 4】
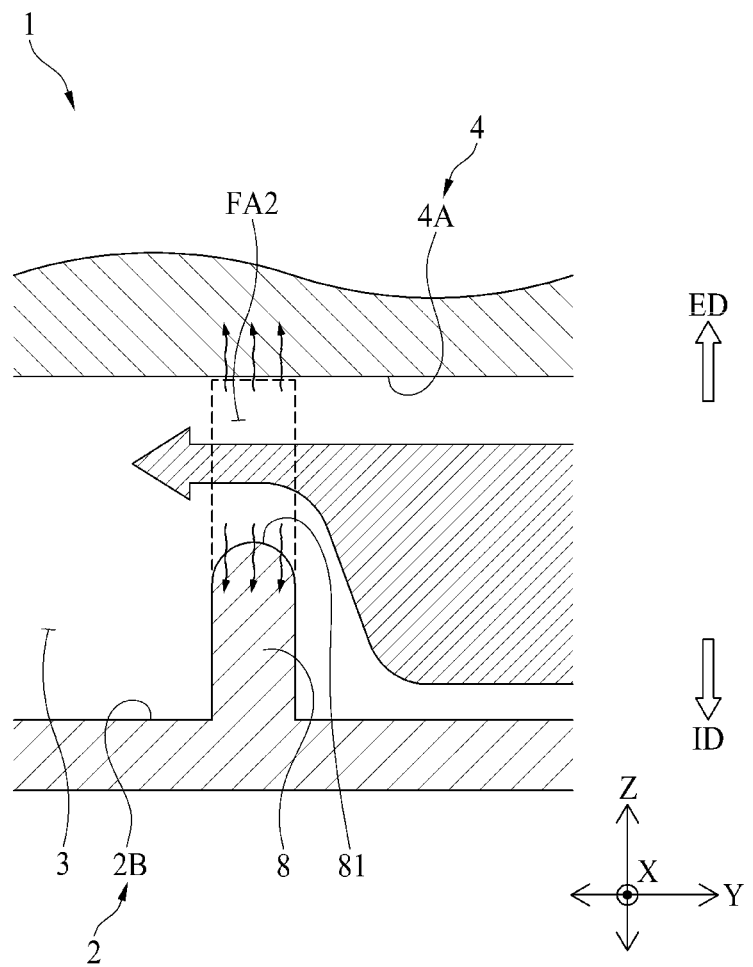

[Figure 5]
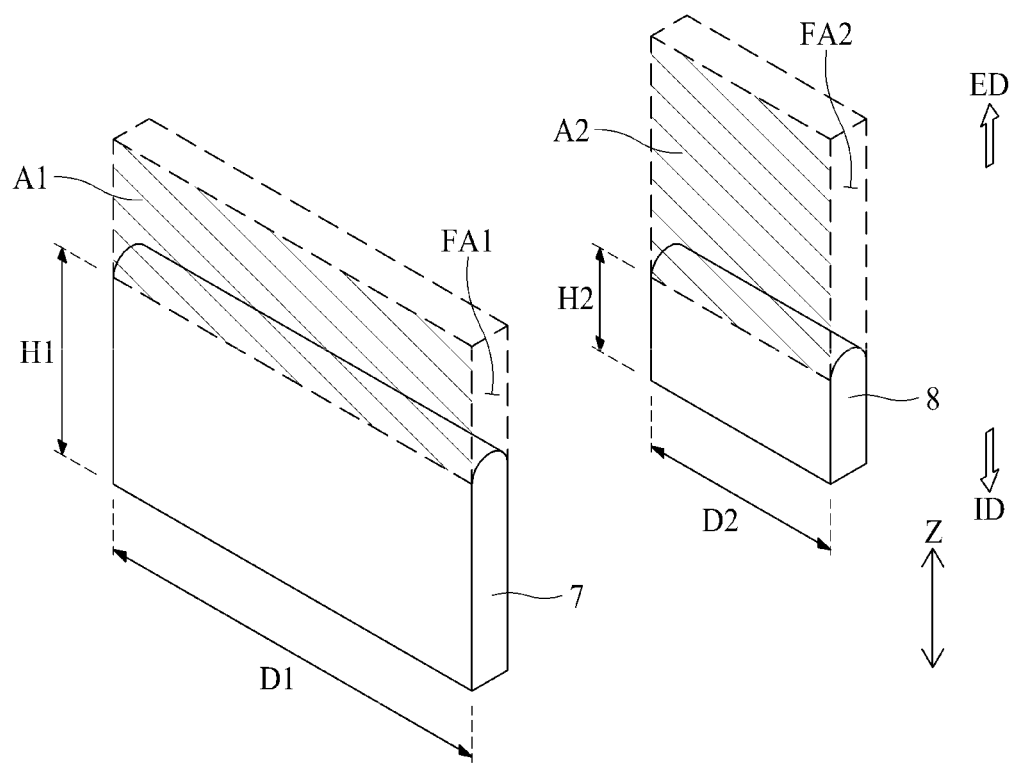

【Figure 6】
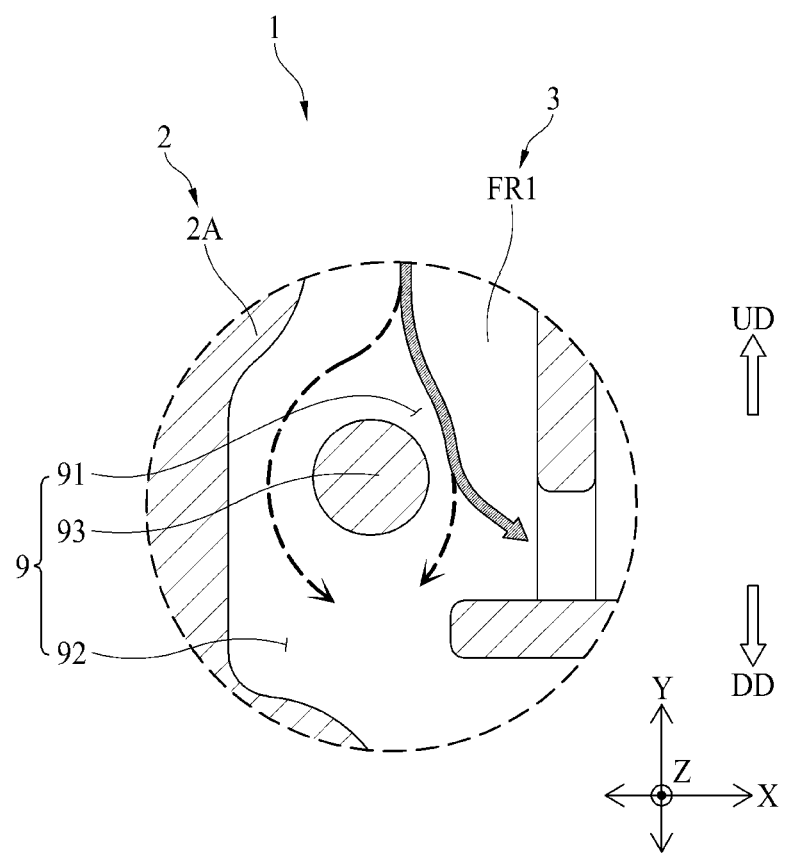

[Figure 7]
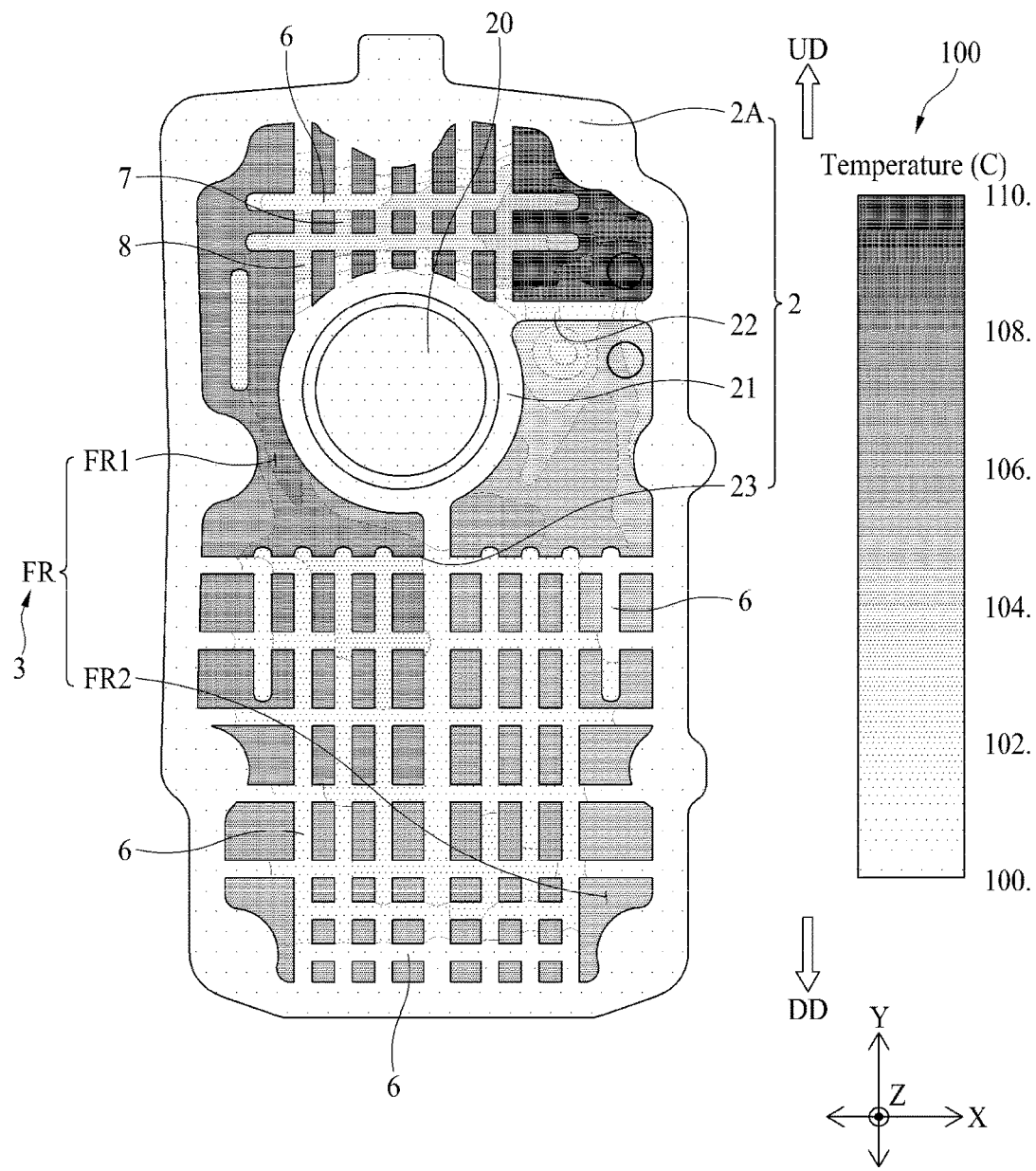

OIL COOLING APPARATUS FOR HYDROSTATIC TRANSMISSIONS

CROSS-REFERENCE TO RELATED APPLICATIONS

Pursuant to 35 U.S.C. § 119(a), this application claims the benefit of earlier filing date and right of priority to Korean Patent Application No. 10-2018-0076479, filed on Jul. 2, 2018 and Korean Patent Application No. 10-2019-0009481 filed on Jan. 24, 2019, the disclosure of which is incorporated herein by reference in its entirety.

TECHNICAL FIELD

The present invention relates to an oil cooling apparatus for hydrostatic transmissions that is capable of cooling oil used in hydrostatic transmissions.

BACKGROUND ART

A hydrostatic transmission is used to adjust torque, velocity, and the like as needed during operation and traveling processes of a vehicle. The hydrostatic transmission may perform a shift operation of the vehicle by adjusting torque, velocity, and the like of power provided by a power source such as an engine. Oil is injected into the hydrostatic transmission to operate the hydrostatic transmission. The hydrostatic transmission may perform the shift operation of the vehicle using an oil pressure of the oil.

Here, during a process in which the oil passes through the hydrostatic transmission, the oil receives heat from the hydrostatic transmission, and a temperature of the oil rises. Because the temperature of the oil rises, an apparatus for cooling the oil is required.

However, an oil cooling apparatus for hydrostatic transmissions according to the related art requires a separate oil cooler for cooling oil. Accordingly, the oil cooling apparatus for hydrostatic transmissions according to the related art has a problem in that it requires a space for installing a separate oil cooler in a vehicle, which lowers the spatial efficiency and increases the manufacturing cost.

DISCLOSURE

Technical Problem

The present invention has been devised to solve the problem and is for providing an oil cooling apparatus for hydrostatic transmissions that does not require a separate oil cooler.

Technical Solution

To solve the above problem, the present invention may include the following configurations.

An oil cooling apparatus for hydrostatic transmissions according to the present invention may include a cooling main body coupled to a transmission case in which a hydrostatic transmission is installed; an accommodating groove formed in the cooling main body to accommodate oil; a cover unit coupled to the cooling main body to cover the accommodating groove; a supply port configured to supply the oil to the accommodating groove; a discharge port configured to discharge the oil from the accommodating groove; a plurality of guide ribs installed at positions spaced apart from each other to guide a flow direction of oil flowing along a flow path formed in the accommodating groove; a first hurdle unit coupled to at least one of the guide ribs to form a first flow region through which the oil passes; and a second hurdle unit coupled to at least one of the guide ribs to form a second flow region through which the oil passes.

Advantageous Effects

According to the present invention, the oil cooling apparatus for hydrostatic transmissions may have the following effects.

First, the present invention is implemented to be coupled to a transmission case to cool oil. Therefore, because the present invention does not require a separate oil cooler for a hydrostatic transmission, the spatial efficiency can be improved in relation to the vicinity of the hydrostatic transmission, and the manufacturing cost can be reduced.

Second, because the present invention is implemented to decrease areas of a first flow region and a second flow region using a first hurdle unit and a second hurdle unit, respectively, a flow velocity of oil passing through each of the first flow region and the second flow region can be increased. Here, when the flow velocity of the oil passing through the flow regions is increased, because heat transfer due to convection is increased, the amount of heat transferred from the oil to a cover unit, guide ribs, the first hurdle unit, the second hurdle unit, and the like can be increased. Therefore, because the present invention increases the amount of heat dissipated to the outside via the cover unit, the oil cooling performance can be improved.

DESCRIPTION OF DRAWINGS

FIG. 1 is a schematic side cross-sectional view of an oil cooling apparatus for hydrostatic transmissions according to the present invention.

FIG. 2 is a schematic front cross-sectional view of the oil cooling apparatus for hydrostatic transmissions according to the present invention.

FIG. 3 is a schematic side cross-sectional view illustrating a state in which oil passes through a first flow region formed by a first hurdle unit in the oil cooling apparatus for hydrostatic transmissions according to the present invention.

FIG. 4 is a schematic side cross-sectional view illustrating a state in which oil passes through a second flow region formed by a second hurdle unit in the oil cooling apparatus for hydrostatic transmissions according to the present invention.

FIG. 5 is a schematic perspective view illustrating a case in which the first hurdle unit and the second hurdle unit have different lengths in an inward-outward direction in the oil cooling apparatus for hydrostatic transmissions according to the present invention.

FIG. 6 is a schematic enlarged view of portion A in FIG. 2 of the oil cooling apparatus for hydrostatic transmissions according to the present invention.

FIG. 7 is a schematic front cross-sectional view illustrating a temperature of oil accommodated in an accommodating groove in the oil cooling apparatus for hydrostatic transmissions according to the present invention.

DETAILED DESCRIPTION OF THE INVENTION

Hereinafter, embodiments of an oil cooling apparatus for hydrostatic transmissions according to the present invention will be described in detail with reference to the accompanying drawings.

Referring to FIGS. 1 to 7, an oil cooling apparatus 1 for hydrostatic transmissions according to the present invention cools oil used in an operation of a hydrostatic transmission. The oil cooling apparatus 1 for hydrostatic transmissions according to the present invention is coupled to a hydrostatic transmission (not illustrated) configured to adjust a velocity at which an agricultural vehicle, such as a tractor and a combine, travels. The hydrostatic transmission performs a shift function of adjusting the torque, velocity, and the like as needed in the agricultural vehicle. The hydrostatic transmission is installed in a transmission case 10.

To this end, the oil cooling apparatus 1 for hydrostatic transmissions according to the present invention includes a cooling main body 2 coupled to the transmission case 10 in which a hydrostatic transmission is installed; an accommodating groove 3 formed in the cooling main body 2 to accommodate oil; a cover unit 4 coupled to the cooling main body 2 to cover the accommodating groove 3; a supply port 51 configured to supply the oil to the accommodating groove 3; a discharge port 52 configured to discharge the oil from the accommodating groove 3; a plurality of guide ribs 6 installed at positions spaced apart from each other to guide a flow direction of oil flowing along a flow path FR formed in the accommodating groove 3; a first hurdle unit 7 coupled to at least one of the guide ribs 6 to form a first flow region FA1 through which the oil passes; and a second hurdle unit 8 coupled to at least one of the guide ribs 6 to form a second flow region FA2 through which the oil passes. Accordingly, the oil cooling apparatus 1 for hydrostatic transmissions according to the present invention may have the following effects.

First, the oil cooling apparatus 1 for hydrostatic transmissions according to the present invention is implemented to be coupled to the transmission case 10 to cool oil. Therefore, because the oil cooling apparatus 1 for hydrostatic transmissions according to the present invention does not require a separate oil cooler for a hydrostatic transmission, the spatial efficiency can be improved in relation to the vicinity of the hydrostatic transmission, and the manufacturing cost can be reduced.

Second, because the oil cooling apparatus 1 for hydrostatic transmissions according to the present invention is implemented to decrease the areas of the first flow region FA1 and the second flow region FA2 by the first hurdle unit 7 and the second hurdle unit 8, respectively, a flow velocity of the oil passing through each of the first flow region FA1 and the second flow region FA2 can be increased. Here, when the flow velocity of the oil passing through the flow regions is increased, because heat transfer due to convection is increased, the amount of heat transferred from the oil to the cover unit 4, the guide ribs 6, the first hurdle unit 7, the second hurdle unit 8, and the like can be increased. Therefore, because the oil cooling apparatus 1 for hydrostatic transmissions according to the present invention increases the amount of heat dissipated to the outside via the cover unit 4, the oil cooling performance can be improved.

In addition, the oil cooling apparatus 1 for hydrostatic transmissions according to the present invention may be implemented so that, in an inward-outward direction (Z-axis direction) that is parallel to each of an inward direction (a direction indicated by an arrow ID), which is a direction from the cover unit 4 toward the accommodating groove 3, and an outward direction (a direction indicated by an arrow ED), which is opposite the inward direction (the direction indicated by the arrow ID), the first hurdle unit 7 and the second hurdle unit 8 are formed such that the first flow region FA1 and the second flow region FA2 have different lengths from each other. That is, the oil cooling apparatus 1 for hydrostatic transmissions according to the present invention may be implemented so that the second hurdle unit 8 and the first hurdle unit 7 have different lengths from each other in the inward-outward direction (Z-axis direction). Accordingly, the oil cooling apparatus 1 for hydrostatic transmissions according to the present invention is implemented so that the length of each of the first hurdle unit 7 and the second hurdle unit 8 in the inward-outward direction (Z-axis direction) is adjustable according to an oil pressure of oil passing through the first flow region FA1 and the second flow region FA2. Therefore, because the oil cooling apparatus 1 for hydrostatic transmissions according to the present invention prevents the case in which the oil pressure of the oil accommodated in the accommodating groove 3 is excessively increased, the case in which the cooling main body 2, the guide ribs 6, and the like are damaged or broken due to the oil pressure of the oil can be prevented, and thus the time and cost required for maintenance and repair can be reduced.

Hereinafter, the cooling main body 2, the accommodating groove 3, the cover unit 4, the supply port 51, the discharge port 52, the guide ribs 6, the first hurdle unit 7, and the second hurdle unit 8 will be described in detail with reference to the accompanying drawings.

Referring to FIGS. 1 to 7, the cooling main body 2 is coupled to the transmission case 10. The transmission case 10 serves as a case that couples components of the hydrostatic transmission. The cooling main body 2 serves as a main body of the oil cooling apparatus 1 for hydrostatic transmissions according to the present invention. The cooling main body 2 may be coupled to the transmission case 10 by a coupling member such as a bolt. The cooling main body 2 may be integrally formed with the transmission case 10.

Referring to FIGS. 1 to 7, the cooling main body 2 may include an outer wall 2A and a bottom surface 2B.

The outer wall 2A serves as a structure of the cooling main body 2 that surrounds the accommodating groove 3. A coupling member such as a bolt may be coupled to the outer wall 2A so that the outer wall 2A receives a supporting force from the transmission case 10. The outer wall 2A may prevent leakage of the oil to the outside of the accommodating groove 3. The bottom surface 2B is one surface formed in the cooling main body 2 by the accommodating groove 3 and may be a surface facing the outward direction (the direction indicated by the arrow ED) in the cooling main body 2. The outward direction (the direction indicated by the arrow ED) is a direction from the accommodating groove 3 toward the cover unit 4. That is, the accommodating groove 3 may be formed in the cooling main body 2 through the cover unit 4, the bottom surface 2B, and the outer wall 2A.

Referring to FIGS. 2 to 7, the cooling main body 2 may include an installing member 21, a blocking member 22, and a separating rib 23.

An input shaft 20 is installed in the installing member 21. The input shaft 20 inputs power to the hydrostatic transmission. The input shaft 20 may be formed to extend in the inward-outward direction (Z-axis direction) that is parallel to each of the inward direction (the direction indicated by the arrow ID) and the outward direction (the direction indicated by the arrow ED). The installing member 21 may be formed to surround the input shaft 20 and prevent the oil accommodated in the accommodating groove 3 from coming into contact with the input shaft 20. The installing member 21 may be formed to protrude in the outward direction (the direction indicated by the arrow ED) from the bottom surface 2B. When the cover unit 4 is coupled to the cooling main body 2, the installing member 21 may come into contact with the cover unit 4 and keep the accommodating groove 3 sealed.

The blocking member 22 is coupled to each of the outer wall 2A and the installing member 21. The blocking member 22 may separate the flow path FR into the supply flow path FR1 and the discharge flow path FR2. The flow path FR causes the oil to flow and is formed in the accommodating groove 3. The supply flow path FR1 refers to a portion of the flow path FR connected to the supply port 51. The discharge flow path FR2 refers to a portion of the flow path FR connected to the discharge port 52. The blocking member 22 may be disposed on the shortest path connecting the supply port 51 and the discharge port 52. The blocking member 22 may block the shortest path along which the oil supplied via the supply port 51 flows toward the discharge port 52.

Accordingly, the oil cooling apparatus 1 for hydrostatic transmissions according to the present invention is implemented to prevent the case in which the oil supplied via the supply port 51 immediately flows toward the discharge port 52 instead of sequentially flowing along the supply flow path FR1 and the discharge flow path FR2. Therefore, the oil cooling apparatus 1 for hydrostatic transmissions according to the present invention may increase the overall length along which the oil flows, thereby increasing time during which the oil stays in the accommodating groove 3 and further improving the oil cooling performance.

The blocking member 22 may be coupled to the side of the outer wall 2A adjacent to each of the supply port 51 and the discharge port 52. The blocking member 22 may be formed in the form of a quadrangular plate having a uniform overall thickness.

The separating rib 23 is coupled to the installing member 21. The separating rib 23 may extend in a downward direction (a direction indicated by an arrow DD). The downward direction (the direction indicated by the arrow DD) may be a direction from the supply port 51 toward the discharge port 52. Along the separating rib 23, the supply flow path FR1 and the discharge flow path FR2 may be formed to extend in the downward direction (the direction indicated by the arrow DD).

Accordingly, the oil cooling apparatus 1 for hydrostatic transmissions according to the present invention is implemented so that a length at which the supply flow path FR1 and the discharge flow path FR2 extend in the downward direction (the direction indicated by the arrow DD) due to the separating rib 23 increases. Therefore, because the oil cooling apparatus 1 for hydrostatic transmissions according to the present invention not only increases a bypass radius at which the oil bypasses on the way to the discharge port 52 but also increases the lengths of the supply flow path FR1 and the discharge flow path FR2, the time during which the oil stays in the accommodating groove 3 can be further increased. Accordingly, because the oil cooling apparatus 1 for hydrostatic transmissions according to the present invention increases the time during which the oil is cooled, the oil cooling performance can be further improved.

A working fluid that has flowed through the supply flow path FR1 may turn around at one side of the separating rib 23 and be introduced into the discharge flow path FR2. The one side of the separating rib 23 may be disposed at a position spaced apart from the outer wall 2A. The other side of the separating rib 23 may be coupled to the installing member 21. The separating rib 23 and the installing member 21 may be integrally formed. The separating rib 23 may be formed in the form of a quadrangular plate having a uniform overall thickness, but embodiments are not limited thereto, and the separating rib 23 may be formed in any other form as long as the form extends in the downward direction (the direction indicated by the arrow DD). For example, the separating rib 23 may be formed in the form of a curved plate so that the flow resistance of the oil is decreased. The separating rib 23 may be disposed in the vicinity of the center of the accommodating groove 3 so that widths of the supply flow path FR1 and the discharge flow path FR2 are substantially the same. Here, the widths of the supply flow path FR1 and the discharge flow path FR2 may respectively be the lengths of the supply flow path FR1 and the discharge flow path FR2 in a direction perpendicular to each of a flow direction of a main flow of the oil and the inward-outward direction (Z-axis direction). The main flow of the oil refers to a mainstream of the oil passing through the flow path FR, excluding irregular flows.

Referring to FIGS. 1 to 7, the accommodating groove 3 accommodates the oil. The accommodating groove 3 may be formed in the cooling main body 2. The oil may be cooled while being accommodated in the accommodating groove 3. The accommodating groove 3 may be formed in the one surface facing the outward direction (the direction indicated by the arrow ED) in the cooling main body 2. Accordingly, as compared with the case in which the accommodating groove 3 is not formed in the one surface facing the outward direction (the direction indicated by the arrow ED) in the cooling main body 2, the oil cooling apparatus 1 for hydrostatic transmissions according to the present invention is implemented so that the oil is accommodated in a site that is further spaced apart from the transmission case 10 in the outward direction (the direction indicated by the arrow ED). Therefore, because the oil cooling apparatus 1 for hydrostatic transmissions according to the present invention is capable of decreasing the amount of heat generated by the hydrostatic transmission that is directly transferred from the hydrostatic transmission to the oil accommodated in the accommodating groove 3, the oil cooling performance can be further improved.

Referring to FIG. 2, the flow path FR may be formed in the accommodating groove 3. The flow path FR causes the oil to flow. That is, the flow path FR may serve as a path for the oil to flow in the accommodating groove 3. The flow path FR may correspond to either a portion of the accommodating groove 3 or the entire accommodating groove 3. The flow path FR may be connected to each of the supply port 51 and the discharge port 52. Therefore, the oil supplied via the supply port 51 may flow along the flow path FR and then be discharged via the discharge port 52. The flow path FR may include the supply flow path FR1 connected to the supply port 51 and the discharge flow path FR2 connected to the discharge port 52. The supply flow path FR1 and the discharge flow path FR2 may be formed by the separating rib 23.

Referring to FIGS. 1 to 4, the cover unit 4 is coupled to the cooling main body 2. The cover unit 4 may be coupled to the cooling main body 2 so as to cover the accommodating groove 3. When the oil is supplied to the accommodating groove 3, the oil may flow along the flow path FR formed in the accommodating groove 3 between the cooling main body 2 and the cover unit 4. The cover unit 4 may dissipate heat from the oil accommodated in the accommodating groove 3. Upon receiving heat from the oil accommodated in the accommodating groove 3, the cover unit 4 may dissipate the heat to the outside, thereby cooling the oil accommodated in the accommodating groove 3. The cover unit 4 may be coupled to the cooling main body 2 at a side opposite to the bottom surface 2B with respect to the accommodating groove 3. The cover unit 4 may be detachably coupled to the cooling main body 2. The cover unit 4 may be coupled to the cooling main body 2 by a fastening member such as a bolt. The cover unit 4 may be disposed in the outward direction (the direction indicated by the arrow ED) from the cooling main body 2.

Referring to FIGS. 1 to 4, the cover unit 4 may include an inner surface 4A.

The inner surface 4A is one surface of the cover unit 4 adjacent to the accommodating groove 3. The inner surface 4A may face the inward direction (the direction indicated by the arrow ID). The inner surface 4A may be disposed at a position opposite to the bottom surface 2B with respect to the accommodating groove 3. The inner surface 4A may receive heat from the oil accommodated in the accommodating groove 3. The heat transferred to the inner surface 4A may be dissipated from the cover unit 4 via a surface disposed in the outward direction (the direction indicated by the arrow ED).

Referring to FIGS. 2 to 7, the supply port 51 supplies oil to the accommodating groove 3. The supply port 51 may be connected to each of a hydrostatic line in the hydrostatic transmission and the accommodating groove 3. Accordingly, the oil may flow along the hydrostatic line in the hydrostatic transmission and then be supplied to the accommodating groove 3 via the supply port 51. The supply port 51 may be formed in the bottom surface 2B. The supply port 51 may be connected to the supply flow path FR1.

Referring to FIGS. 2 to 7, the discharge port 52 discharges oil from the accommodating groove 3. The discharge port 52 may be connected to each of the hydrostatic line in the hydrostatic transmission and the accommodating groove 3. Accordingly, the oil supplied to the accommodating groove 3 via the supply port 51 may flow along the flow path FR formed in the accommodating groove 3 and then be discharged again to the hydrostatic line in the hydrostatic transmission via the discharge port 52. The discharge port 52 may be formed in the bottom surface 2B. The discharge port 52 may be connected to the discharge flow path FR2. The discharge port 52 may be disposed at a position spaced apart from the supply port 51.

Referring to FIGS. 2 to 7, the guide ribs 6 guide a flow direction of the oil flowing along the flow path FR. The guide ribs 6 may be installed at positions spaced apart from each other. The oil may flow along outer surfaces of the guide ribs 6 such that the flow direction of the oil is guided. Accordingly, the oil cooling apparatus 1 for hydrostatic transmissions according to the present invention can lower a degree at which turbulence occurs in the oil flowing along the flow path FR as a width of the flow path FR widens excessively. Therefore, the oil cooling apparatus 1 for hydrostatic transmissions according to the present invention lowers a degree at which, even when the oil accommodated in the accommodating groove 3 is completely cooled, the oil stays in the accommodating groove 3 due to turbulence, thereby further improving the oil cooling performance.

The guide ribs 6 may be formed to protrude in the outward direction (the direction indicated by the arrow ED) from the bottom surface 2B. The guide ribs 6 may also be formed to protrude in the inward direction (the direction indicated by the arrow ID) from the inner surface 4A. When the cover unit 4 is coupled to the cooling main body 2, the guide ribs 6 may come into contact with each of the inner surface 4A and the bottom surface 2B.

The guide ribs 6 may be formed to extend substantially in the direction in which the flow path FR is formed. For example, when the flow path FR is formed to extend in a vertical direction (Y-axis direction) that is parallel to each of the downward direction (the direction indicated by the arrow DD) and an upward direction (a direction indicated by an arrow UD), which is opposite the downward direction (the direction indicated by the arrow DD), some of the guide ribs 6 may be formed to extend in the vertical direction (Y-axis direction). For example, when the flow path FR is formed to extend in a horizontal direction (X-axis direction) that is perpendicular to each of the vertical direction (Y-axis direction) and the inward-outward direction (Z-axis direction), some of the guide ribs 6 may be formed to extend in the horizontal direction (X-axis direction). The guide ribs 6 may be formed at positions spaced apart from each of the outer wall 2A, the installing member 21, the blocking member 22, and the separating rib 23. As a width of the flow path FR increases, a larger number of guide ribs 6 may be disposed on the corresponding flow path FR.

Referring to FIGS. 2 to 7, the first hurdle unit 7 is coupled to at least one of the guide ribs 6. Although a plurality of hurdle units are illustrated in FIG. 2, the first hurdle unit 7 may be any one of them. The first hurdle unit 7 may form the first flow region FA1. The first flow region FA1 is a region for allowing the oil to pass through the first hurdle unit 7. The first flow region FA1 may be formed to have a smaller length than the accommodating groove 3 in the inward-outward direction (Z-axis direction). The oil may flow over the first hurdle unit 7 during the process in which the oil passes through the first flow region FA1.

Accordingly, the oil cooling apparatus 1 for hydrostatic transmissions according to the present invention increases a flow velocity of oil passing through the first flow region FA1 formed by the first hurdle unit 7, thereby increasing the amount of heat transferred from the oil to the cover unit 4. This is because convection heat transfer related to the oil increases as the flow velocity of the oil increases. The amount of heat transferred from the oil to the cover unit 4, the guide ribs 6, the first hurdle unit 7, and the like may be increased. Therefore, the oil cooling apparatus 1 for hydrostatic transmissions according to the present invention increases the amount of heat dissipated to the outside via the cover unit 4, thereby improving the oil cooling performance.

Such effects can be seen from FIG. 7 that shows a result of three-dimensional computational fluid dynamics (CFD) analysis as the oil accommodated in the accommodating groove 3 is caused to flow from the supply port 51 to the discharge port 52 in an embodiment of the oil cooling apparatus 1 for hydrostatic transmissions according to the present invention. FIG. 7 is an experimental result showing a temperature of the oil accommodated in the accommodating groove 3 while the cover unit 4 is coupled to the cooling main body 2 in the oil cooling apparatus 1 for hydrostatic transmissions according to the present invention. Referring to a bar 100 shown on the right side of FIG. 7, it can be seen that the temperature of the oil accommodated in the accommodating groove 3 is distinguished by density of dots. That is, the temperature of the oil is higher as the density of the dots becomes higher, and the temperature of the oil is lower as the density of the dots becomes lower. Here, although configurations and positions thereof illustrated in FIG. 7 are somewhat different from those illustrated in FIG. 2, because the differences are merely for convenience of CFD analysis, the result of CFD is substantially the same in the cases of FIGS. 2 and 7.

Referring to FIG. 7, it can be seen that the oil transfers heat to the guide ribs 6 and the hurdle units during a process in which the oil passes through the plurality of hurdle units. This can be recognized from an aspect that the density of dots in the guide ribs 6 and the hurdle units is relatively higher than that in the outer wall 2A. That is, the convection heat transfer by the oil does not actively occur in the vicinity of the outer wall 2A where the oil flows at a relatively low flow velocity but actively occurs in the flow regions of the hurdle units where the oil flows at a relatively high flow velocity.

Referring to FIGS. 2 to 7, the first hurdle unit 7 may extend in a direction perpendicular to a direction in which the guide ribs 6 coupled thereto extend. For example, when the guide ribs 6 coupled to the first hurdle unit 7 are formed to extend in the horizontal direction (X-axis direction), the first hurdle unit 7 may extend in the vertical direction (Y-axis direction). For example, when the guide ribs 6 coupled to the first hurdle unit 7 are formed to extend in the vertical direction (Y-axis direction), the first hurdle unit 7 may extend in the horizontal direction (X-axis direction). In this case, because the main flow of the oil flows in the direction in which the guide ribs 6 are formed, the oil flows in a direction perpendicular to the first flow region FA1 and passes through the first flow region FA1.

Referring to FIG. 3, the first hurdle unit 7 may be formed at a position spaced apart from the inner surface 4A in the inward direction (the direction indicated by the arrow ID). That is, the first flow region FA1 may be formed between the inner surface 4A and the first hurdle unit 7. The first flow region FA1 may be formed at a site adjacent to the inner surface 4A. Therefore, the flow velocity of the oil may be increased at the site adjacent to the inner surface 4A during a process in which the oil passes through the first flow region FA1.

Accordingly, because the oil with an increased flow velocity flows at the site adjacent to the inner surface 4A in the oil cooling apparatus 1 for hydrostatic transmissions according to the present invention, the amount of heat transferred from the oil to the inner surface 4A may be increased. Therefore, as compared with the case in which the first flow region FA1 is not formed at the site adjacent to the inner surface 4A, because the oil cooling apparatus 1 for hydrostatic transmissions according to the present invention significantly increases the amount of heat dissipated to the outside via the cover unit 4, the oil cooling performance can be further improved.

The first hurdle unit 7 may be formed to protrude in the outward direction (the direction indicated by the arrow ED) from the bottom surface 2B. The first hurdle unit 7 may be coupled to the outer wall 2A. The first hurdle unit 7 may also be coupled to the installing member 21, the separating rib 23, and the like. The first hurdle unit 7 may be formed at a position spaced apart from the second hurdle unit 8.

Referring to FIG. 3, the first hurdle unit 7 may include a first flow surface 71.

The first flow surface 71 (illustrated in FIG. 3) forms the first flow region FA1. The oil may be guided by the first flow surface 71 during a process in which the oil passes through the first flow region FA1. The first flow surface 71 may be one surface facing the first flow region FA1 from the first hurdle unit 7. The first flow surface 71 may be formed as a curved surface that is convex in a direction facing the first flow region FA1. Therefore, the oil flowing at a position close to the bottom surface 2B may be smoothly guided in the outward direction (the direction indicated by the arrow ED) by the first flow surface 71 and pass through the first flow region FA1.

Accordingly, as compared with the case in which the first flow surface 71 is formed as a flat surface, the oil cooling apparatus 1 for hydrostatic transmissions according to the present invention is implemented to lower a degree at which the oil rubs against the first hurdle unit 7 during the process in which the oil passes through the first flow region FA1. Therefore, the oil cooling apparatus 1 for hydrostatic transmissions according to the present invention decreases the flow resistance of the oil, thereby further increasing the flow velocity of the oil introduced into the first flow region FA1 and further improving the oil cooling performance.

Referring to FIGS. 2 to 7, the second hurdle unit 8 is coupled to at least one of the guide ribs 6. Although a plurality of hurdle units are illustrated in FIG. 2, the second hurdle unit 8 may be any one of them. The second hurdle unit 8 may form the second flow region FA2. The second flow region FA2 is a region for allowing the oil to pass through the second hurdle unit 8. The second flow region FA2 may be formed to have a smaller length than the accommodating groove 3 in the inward-outward direction (Z-axis direction). The oil may flow over the second hurdle unit 8 during the process in which the oil passes through the second flow region FA2.

Accordingly, the oil cooling apparatus 1 for hydrostatic transmissions according to the present invention increases a flow velocity of oil passing through the second flow region FA2 formed by the second hurdle unit 8, thereby increasing the amount of heat transferred from the oil to the cover unit 4. This is because convection heat transfer related to the oil increases as the flow velocity of the oil increases. The amount of heat transferred from the oil to the cover unit 4, the guide ribs 6, the second hurdle unit 8, and the like may be increased. Therefore, the oil cooling apparatus 1 for hydrostatic transmissions according to the present invention increases the amount of heat dissipated to the outside via the cover unit 4, thereby improving the oil cooling performance.

Such effects can be seen from FIG. 7 that shows a result of CFD as the oil accommodated in the accommodating groove 3 is caused to flow from the supply port 51 to the discharge port 52 in an embodiment of the oil cooling apparatus 1 for hydrostatic transmissions according to the present invention. Referring to the bar 100 shown on the right side of FIG. 7, it can be seen that the temperature of the oil accommodated in the accommodating groove 3 is distinguished by density of dots. That is, the temperature of the oil is higher as the density of the dots is higher, and the temperature of the oil is lower as the density of the dots is lower.

Referring to FIG. 7, it can be seen that the oil transfers heat to the guide ribs 6 and the hurdle units during a process in which the oil passes through the plurality of hurdle units. This can be recognized from the aspect that the density of dots in the guide ribs 6 and the hurdle units is relatively higher than that in the outer wall 2A. That is, the convection heat transfer by the oil does not actively occur in the vicinity of the outer wall 2A where the oil flows at a relatively low flow velocity but actively occurs in the flow regions of the hurdle units where the oil flows at a relatively high flow velocity.

Referring to FIGS. 2 to 7, the second hurdle unit 8 may extend in a direction perpendicular to a direction in which the guide ribs 6 coupled thereto extend. For example, when the guide ribs 6 coupled to the second hurdle unit 8 are formed to extend in the horizontal direction (X-axis direction), the second hurdle unit 8 may extend in the vertical direction (Y-axis direction). For example, when the guide ribs 6 coupled to the second hurdle unit 8 are formed to extend in the vertical direction (Y-axis direction), the second hurdle unit 8 may extend in the horizontal direction (X-axis direction). In this case, because the main flow of the oil flows in the direction in which the guide ribs 6 are formed, the oil flows in a direction perpendicular to the second flow region FA2 and passes through the second flow region FA2.

Referring to FIG. 5, the second hurdle unit 8 and the first hurdle unit 7 may be formed so that the second flow region FA2 and the first flow region FA1 have different lengths from each other in the inward-outward direction (Z-axis direction). That is, the second hurdle unit 8 and the first hurdle unit 7 may be formed to have different lengths from each other in the inward-outward direction (Z-axis direction). When a length H2 of the second hurdle unit 8 in the inward-outward direction (Z-axis direction) and a length H1 of the first hurdle unit 7 in the inward-outward direction (Z-axis direction) are each increased, a length of the second flow region FA2 in the inward-outward direction (Z-axis direction) and a length of the first flow region FA1 in the inward-outward direction (Z-axis direction) are each decreased. In this case, because an area A2 of the second flow region FA2 and an area A1 of the first flow region FA1 are each decreased, the oil pressure of the oil passing through the second flow region FA2 and the first flow region FA1 may be decreased. When the length H2 of the second hurdle unit 8 in the inward-outward direction (Z-axis direction) and the length H1 of the first hurdle unit 7 in the inward-outward direction (Z-axis direction) are each decreased, the length of the second flow region FA2 in the inward-outward direction (Z-axis direction) and the length of the first flow region FA1 in the inward-outward direction (Z-axis direction) are each increased. In this case, because the area A2 of the second flow region FA2 and the area A1 of the first flow region FA1 are each increased, the oil pressure of the oil passing through the second flow region FA2 and the first flow region FA1 may be increased Accordingly, the oil cooling apparatus 1 for hydrostatic transmissions according to the present invention is implemented so that the length of each of the first hurdle unit 7 and the second hurdle unit 8 in the inward-outward direction (Z-axis direction) is adjustable according to the oil pressure of the oil passing through the first flow region FA1 and the second flow region FA2. Therefore, because the oil cooling apparatus 1 for hydrostatic transmissions according to the present invention prevents the case in which the oil pressure of the oil accommodated in the accommodating groove 3 is excessively increased, the case in which the cooling main body 2, the guide ribs 6, and the like are damaged or broken due to the oil pressure of the oil can be prevented, and thus the time and cost required for maintenance and repair can be reduced.

Referring to FIG. 5, when the second hurdle unit 8 is formed so that the second flow region FA2 has a smaller width than the first flow region FA1 (D2<D1), the second hurdle unit 8 may be formed to have a shorter length than the first hurdle unit 7 in the inward-outward direction (Z-axis direction) (H2<H1). When the second hurdle unit 8 is formed so that the second flow region FA2 has a larger width than the first flow region FA1 (D2>D1), the second hurdle unit 8 may be formed to have a longer length than the first hurdle unit 7 in the inward-outward direction (Z-axis direction) (H2>H1).

Accordingly, the oil cooling apparatus 1 for hydrostatic transmissions according to the present invention is implemented so that the area A1 of the first flow region FA1 and the area A2 of the second flow region FA2 are substantially the same. Therefore, the oil cooling apparatus 1 for hydrostatic transmissions according to the present invention may lower a degree at which turbulence occurs in the main flow of the oil due to an excessive variation in the oil pressure of the oil during a process in which the oil passes through a flow region having a narrow width.

Referring to FIG. 4, the second hurdle unit 8 may be formed at a position spaced apart from the inner surface 4A in the inward direction (the direction indicated by the arrow ID). That is, the second flow region FA2 may be formed between the inner surface 4A and the second hurdle unit 8. The second flow region FA2 may be formed at a site adjacent to the inner surface 4A. Therefore, the flow velocity of the oil may be increased at the site adjacent to the inner surface 4A during a process in which the oil passes through the second flow region FA2.

Accordingly, because the oil with an increased flow velocity flows at the site adjacent to the inner surface 4A in the oil cooling apparatus 1 for hydrostatic transmissions according to the present invention, the amount of heat transferred from the oil to the inner surface 4A may be increased. Therefore, as compared with the case in which the second flow region FA2 is not formed at the site adjacent to the inner surface 4A, because the oil cooling apparatus 1 for hydrostatic transmissions according to the present invention significantly increases the amount of heat dissipated to the outside via the cover unit 4, the oil cooling performance can be further improved.

The second hurdle unit 8 may be formed to protrude in the outward direction (the direction indicated by the arrow ED) from the bottom surface 2B. The second hurdle unit 8 may be coupled to the outer wall 2A. The second hurdle unit 8 may also be coupled to the installing member 21, the separating rib 23, and the like. The second hurdle unit 8 may be formed at a position spaced apart from the first hurdle unit 7.

Referring to FIG. 4, the second hurdle unit 8 may include a second flow surface 81.

The second flow surface 81 (illustrated in FIG. 4) forms the second flow region FA2. The oil may be guided by the second flow surface 81 during a process in which the oil passes through the second flow region FA2. The second flow surface 81 may be one surface facing the second flow region FA2 from the second hurdle unit 8. The second flow surface 81 may be formed as a curved surface that is convex in a direction facing the second flow region FA2. Therefore, the oil flowing at a position close to the bottom surface 2B may be smoothly guided in the outward direction (the direction indicated by the arrow ED) by the second flow surface 81 and pass through the second flow region FA2.

Accordingly, as compared with the case in which the second flow surface 81 is formed as a flat surface, the oil cooling apparatus 1 for hydrostatic transmissions according to the present invention is implemented to lower a degree at which the oil rubs against the second hurdle unit 8 during the process in which the oil passes through the second flow region FA2. Therefore, the oil cooling apparatus 1 for hydrostatic transmissions according to the present invention decreases the flow resistance of the oil, thereby further increasing the flow velocity of the oil introduced into the second flow region FA2 and further improving the oil cooling performance.

Referring to FIGS. 2 to 7, the oil cooling apparatus 1 for hydrostatic transmissions according to the present invention may include a mixing unit 9.

The mixing unit 9 mixes the oil flowing along the flow path FR. The mixing unit 9 may constitute a portion of the flow path FR. The oil introduced into the mixing unit 9 may be mixed and flow at a relatively uniform temperature. A plurality of mixing units 9 may be formed. For example, the mixing unit 9 may be formed in each of the supply flow path FR1 and the discharge flow path FR2. The mixing unit 9 may be disposed at a site at which a direction of the oil is switched from the supply flow path FR1 to the discharge flow path FR2. In this case, the mixing unit 9 may mix the oil using the inertia of the oil generated during a process in which the direction of the oil is switched.

Referring to FIGS. 2 and 6, the mixing unit 9 may include a mixing flow path 91, a mixing space 92, and an adjusting member 93.

The mixing flow path 91 causes the oil flowing through the flow path FR to flow. The mixing flow path 91 may cause the main flow of the oil to flow. The oil flowing through the mixing flow path 91 may flow at a relatively higher flow velocity than the oil flowing through the mixing space 92.

The mixing space 92 is a space formed to be connected to the mixing flow path 91. A portion of the oil flowing through the mixing flow path 91 may be branched and introduced into the mixing space 92. The mixing space 92 may mix the oil branched from the main flow of the oil and cause the branched oil to flow toward the mixing flow path 91. Accordingly, a recirculation zone in which the branched oil circulates may be formed in the mixing space 92. The recirculation zone is a zone in which the branched oil circulates and is mixed. The recirculation zone may serve to homogenize a temperature of the branched oil. Accordingly, the oil cooling apparatus 1 for hydrostatic transmissions according to the present invention may have the following effects.

First, the oil cooling apparatus 1 for hydrostatic transmissions according to the present invention is implemented to increase the time during which the oil stays in the accommodating groove 3 due to the recirculation zone formed in the mixing space 92. Therefore, the oil cooling apparatus 1 for hydrostatic transmissions according to the present invention further increases the time during which the oil is cooled in the accommodating groove 3, thereby further improving the oil cooling performance.

Second, the oil cooling apparatus 1 for hydrostatic transmissions according to the present invention is implemented so that the oil flowing at a position adjacent to the inner surface 4A and the oil flowing at a position adjacent to the bottom surface 2B are mixed in the mixing space 92. Therefore, because the oil cooling apparatus 1 for hydrostatic transmissions according to the present invention increases an average temperature of the oil flowing at the position adjacent to the inner surface 4A, the amount of heat dissipated to the outside via the cover unit 4 may be increased, and thus the oil cooling performance can be further improved.

Hereinafter, a process in which the mixing space 92 mixes branched oil and causes the mixed oil to flow toward the mixing flow path 91 will be described in detail with reference to the accompanying drawings. The main flow of oil flowing through the mixing flow path 91 is indicated by a thick solid line. Meanwhile, a branched flow of oil branched from the main flow of oil is indicated by a broken line.

First, referring to FIG. 6, the oil that has flowed through the flow path FR is introduced into the mixing flow path 91. For example, referring to FIG. 6, the oil may flow substantially in the downward direction (the direction indicated by the arrow DD) and be introduced into the mixing flow path 91.

Next, the main flow of oil may flow through the mixing flow path 91. Meanwhile, branched flows branched from the main flow of oil flowing through the mixing flow path 91 may be introduced into the mixing space 92. The branched flows introduced into the mixing space 92 may be mixed with each other while forming a recirculation zone in the mixing space 92.

Next, the branched flows flowing through the mixing space 92 may flow to the mixing flow path 91. The branched flows flowing through the mixing space 92 may flow to the mixing flow path 91 and then join the main flow flowing through the mixing flow path 91.

The adjusting member 93 is disposed between the mixing flow path 91 and the mixing space 92. The adjusting member 93 may block a portion between the mixing flow path 91 and the mixing space 92. The adjusting member 93 may adjust a flow rate of oil branched toward the mixing space 92.

Accordingly, the oil cooling apparatus 1 for hydrostatic transmissions according to the present invention is implemented so that the adjusting member 93 adjusts a flow rate of the branched flows flowing through the mixing space 92 even when the size of the mixing space 92 is large. When the flow rate of the branched flows is excessively increased with respect to the flow rate of the main flow, a problem may occur in which, even when the branched flows flowing through the mixing space 92 are completely cooled, the branched flows continue to circulate through the mixing space 92 instead of flowing toward the mixing flow path 91. Therefore, because the oil cooling apparatus 1 for hydrostatic transmissions according to the present invention lowers a degree at which the cooled oil circulates through the mixing space 92 instead of flowing through the mixing flow path 91, the oil cooling performance can be further improved, and a decrease in the amount of oil introduced into the accommodating groove 3 via the supply port 51 may be prevented.

The present invention is not limited to the above-described exemplary embodiments and the accompanying drawings, and it will be apparent to those of ordinary skilled in the art to which the present invention pertains that various changes, substitutions and alterations may be made herein without departing from the scope of the present invention.

The invention claimed is:

1. An oil cooling apparatus for hydrostatic transmissions, the oil cooling apparatus comprising:
    a cooling main body coupled to a transmission case in which a hydrostatic transmission is installed;
    an accommodating groove formed in the cooling main body to accommodate oil;
    a cover unit coupled to the cooling main body to cover the accommodating groove;
    a supply port configured to supply the oil to the accommodating groove;
    a discharge port configured to discharge the oil from the accommodating groove;
    a plurality of guide ribs installed at positions spaced apart from each other to guide a flow direction of oil flowing along a flow path (FR) formed in the accommodating groove;
    a first hurdle unit coupled to at least one of the guide ribs to form a first flow region (FA1) through which the oil passes; and
    a second hurdle unit coupled to at least one of the guide ribs to form a second flow region (FA2) through which the oil passes,
    wherein, for the first flow region (FA1) to be adjacent to an inner surface (4A) of the cover unit, the first hurdle unit is formed at a position spaced apart from the inner surface (4A) in an inward direction (a direction indicated by an arrow (ID)), which is the direction from the cover unit toward the accommodating groove, wherein, in an inward-outward direction (Z-axis direction) that is parallel to each of the inward direction and an outward direction (a direction indicated by an arrow (ED)), which is opposite the inward direction (the direction indicated by the arrow (ID)), the first hurdle unit and the second hurdle unit are formed to have different lengths from each other such that the first flow region (FA1) and the second flow region (FA2) have different lengths from each other.

2. The oil cooling apparatus of claim 1, wherein each of the first hurdle unit and the second hurdle unit is formed to extend in a direction perpendicular to a direction in which guide ribs coupled thereto extend.

3. The oil cooling apparatus of claim 1, wherein:
the first hurdle unit includes a first flow surface forming the first flow region (FA1); and
the first flow surface is formed as a curved surface that is convex in a direction facing the first flow region (FA1).

4. The oil cooling apparatus of claim 1, wherein, when the second hurdle unit is formed so that the second flow region (FA2) has a smaller width than the first flow region (FA1), the second hurdle unit is formed to have a shorter length than the first hurdle unit in the inward-outward direction (Z-axis direction).

5. The oil cooling apparatus of claim 1, wherein, when the second hurdle unit is formed so that the second flow region (FA2) has a larger width than the first flow region (FA1), the second hurdle unit is formed to have a longer length than the first hurdle unit in the inward-outward direction (Z-axis direction).

6. The oil cooling apparatus of claim 1, wherein, for the second flow region (FA2) to be adjacent to the inner surface (4A) of the cover unit, the second hurdle unit is formed at a position spaced apart from the inner surface (4A) in the inward direction (the direction indicated by the arrow (ID)).

7. The oil cooling apparatus of claim 1, wherein the second hurdle unit includes a second flow surface forming the second flow region (FA2), and wherein the second flow surface is formed as a curved surface that is convex in a direction facing the second flow region (FA2).

8. The oil cooling apparatus of claim 1, further comprising a mixing unit configured to mix the oil flowing along the flow path (FR),
wherein the mixing unit includes a mixing flow path configured to cause a main flow of the oil to flow and a mixing space configured to, as oil branched from the main flow of the oil are introduced, mix the branched oil and cause the mixed oil to flow toward the mixing flow path.

9. The oil cooling apparatus of claim 8, further comprising an adjusting member disposed between the mixing flow path and the mixing space,
wherein the adjusting member blocks a portion between the mixing flow path and the mixing space to adjust a flow rate of the oil branched toward the mixing space.

* * * * *